(12) United States Patent
Ott et al.

(10) Patent No.: US 7,476,433 B2
(45) Date of Patent: Jan. 13, 2009

(54) DOCKING BUFFER

(75) Inventors: Rainer Ott, Volkesfeld (DE); Hans Schmatz, Euskirchen (DE)

(73) Assignee: Deutsche Post AG, Bonn (DE)

( * ) Notice: Subject to any disclaimer, the term of this patent is extended or adjusted under 35 U.S.C. 154(b) by 327 days.

(21) Appl. No.: 10/581,877

(22) PCT Filed: Nov. 5, 2004

(86) PCT No.: PCT/DE2004/002489

§ 371 (c)(1),
(2), (4) Date: Jun. 5, 2006

(87) PCT Pub. No.: WO2005/056442

PCT Pub. Date: Jun. 23, 2005

(65) Prior Publication Data

US 2007/0161267 A1    Jul. 12, 2007

(30) Foreign Application Priority Data

Dec. 5, 2003    (DE) ................................. 103 58 041

(51) Int. Cl.
*B32B 3/26* (2006.01)
(52) U.S. Cl. .................... 428/122; 267/140; 267/140.4; 267/153; 405/212; 405/215
(58) Field of Classification Search .................... 428/68, 428/122; 267/140.4, 140, 141, 153; 52/173.2; 405/215, 212, 213
See application file for complete search history.

(56) References Cited

U.S. PATENT DOCUMENTS 5,658,633 A * 8/1997 Di Biase ...................... 428/68
6,120,871 A   9/2000 De Biase et al.

FOREIGN PATENT DOCUMENTS

DE    92 01 381 U1    4/1992
EP    1 182 155 A     2/2002

OTHER PUBLICATIONS

International Search Report Jun. 2005.

* cited by examiner

*Primary Examiner*—Alexander Thomas
(74) *Attorney, Agent, or Firm*—Collard & Roe, P.C.

(57) ABSTRACT

The invention relates to a docking buffer for attaching to ramps, comprising an elastic damping element (3) that is situated between two U-shaped sections (1; 2) consisting of a hard, shock-proof material. The limbs (4; 5) and (6; 7) of said sections are adjacent to one another and can be displaced in relation to one another, the limbs (4; 5) of one U-shaped section (2) converging at an angle α that deviates from 90° in relation to a base surface (9) and the limbs (6; 7) of the other U-shaped section (1) diverging at an angle β that deviates from 90° in relation to a base plate (8). The opening widths between the ends of the limbs (4; 5) and (6; 7) and the sizes of the angles α; β are selected in such a way that the limbs (4; 5) embrace the limbs (6; 7). The advantage of the invention is that it provides a docking buffer with a simple construction that is thus cost-effective to produce, said buffer affording reliable protection even during an off-center collision. The greater width of the mobile section in relation to the fixed section creates a larger impact surface for the docking vehicle.

5 Claims, 5 Drawing Sheets

DOCKING BUFFER

CROSS REFERENCE TO RELATED APPLICATIONS

Figure 1:
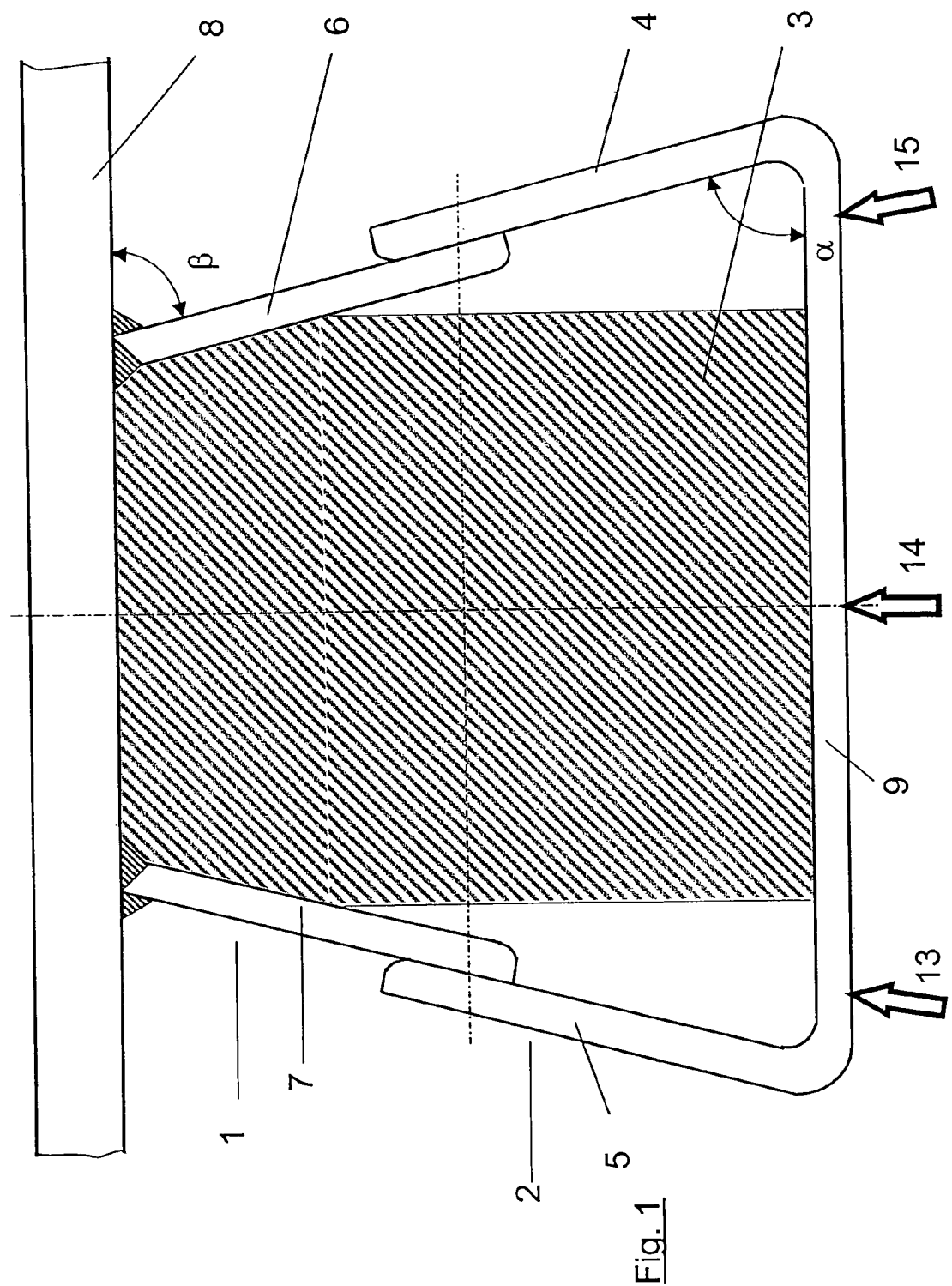

Applicants claim priority under 35 U.S.C. §119 of German Application No. 103 58 041.7 filed Dec. 5, 2003. Applicants also claim priority under 35 U.S.C. §365 of PCT/DE2004/002489 filed Nov. 5, 2004. The international application under PCT article 21(2) was not published in English.

The invention is for a docking buffer to be attached to ramps, especially loading ramps and loading bridges with an elastic damping element between two U-shaped sections made of hard, shock-proof material, the limbs of which are located next to one another and can be displaced in relation to one another. The primary function is to avoid the damaging effects to the building and vehicle when docking the vehicle at the ramp.

In logistics centers and other reloading places, where trucks arrive with freight it is necessary for a connection to be produced between the vehicle and the building. Loading bridges that can be walked on or for rollers or for dollies are frequently in or on the buildings. Due to the fact that the truck must then drive up very closely to the building, the goal is also to avoid damaging the truck or the vehicle by touching.

The damping elements generally attached to buildings to avoid potential damage are subject to very great stress due to rough treatment during the docking of trucks. Known solutions such as those offered by the producers of the loading bridges generally consist of rubber blocks which are attached directly to the building. These rubber blocks are generally damaged and worn after a very short time so that they have no effect and are no longer able to absorb energy. As a result, the building and the loading bridges are seriously damaged.

A further developed damping element is described in utility model DE 9201381.3 U1. Here a solution is presented in which the buffer is attached to a ramp construction and is adjustable in the height so as to take into account the varying height of the docking trucks.

In EP 1 182 155 A2 a ramping buffer is revealed which consists of a C-shaped section and a hat-shaped section the side flange in the C-shaped section is located next to one another and can be displaced in relation to its side flange, whereby the bases stick out of the C-shaped section. Within these sections a core of elastically shaped damping material is planned. The buffer itself can be positioned in the height via a spring element in connection with a hook-locking mechanism.

This is a matter of a solution in which the elastic damping element is located in a complex construction and therefore housed with an expensive steel construction. An additional problem in this technical solution is that four angles are required elements on the C-shaped and the hat-shaped section to surround the elastic element. To maintain the required tolerances on the angled steel components requires considerable effort. Furthermore, this solution in accordance with EP 1 182 155 A2 requires a relatively large amount of material.

The solution described at the outset is only durable to a limited degree and the further developments are very complex in their design. The shapes used there can only be produced with significant costs because each has 4 lines which have to be shaped plastically. With these so-called "anglings" significant problems arise which add up with the series of anglings. A ram buffer with the necessary tolerances to be practical can only be produced with high costs.

The play required between the hat-shaped and c-shaped section in any case leads to a lateral shift of the shape depending on the point of pressure of the docking vehicle on the movable profile of the buffer, which in turn generates a change in the width between the two buffers on the "loading bridge" system. This change is not reset without external influence and therefore has negative effects—the width between the buffers increases and with the docking procedure the probability that both buffers are compressed by the docking truck is reduced significantly. The truck may even drive between the two buffers.

Furthermore, there is an additional disadvantage with this solution, if the collision surface of the steel element is hit on one side by the truck. Then the so-called c-shaped or hat-shaped section is pushed against the other element. This results in a very strong rubbing of steel against steel, which in turn results in material of the two parts being worn off in a very short time. Consequently, it can be expected that the two elements will begin sticking. The elastic element eventually becomes ineffective when a truck bumps against the buffer.

The task of the invention is therefore to provide an improved and inexpensive docking buffer that is simpler in its construction and also provides a definite protection with non-targeted bumping.

The invention fulfills the function with a docking buffer with an elastic damning element between two U-shaped parts made of hard, shock-resistant material, the limbs of which are located next to one another and can be displaced in relation to one another. The limbs of the first U-shaped part are convergent around an angle deviating from 90° to a first base plate and the limbs of the second U-shaped part are convergent around an angle deviating from 90° to a second base plate, whereby the opening widths between the ends of the limbs and the sizes of the angles are selected so that the limbs of the first U-shaped part enclose the limbs of the second U-shaped part.

Advantageous forms of the inventive docking buffer are discussed below.

The invention has the advantage that its design is a simple construction and therefore the docking buffer can be produced inexpensively. As a result of the greater width of the moveable parts of the docking buffer in comparison to the immobile section of the docking buffer on the ramp and the same attached section there is a larger impact surface for the docking vehicle and therefore the probability is greater that the vehicle will hit this surface. Docking buffers constructed in such a manner retain all their functionality even with a lateral stress without a problematic rubbing of the limb of the u-shaped section being caused.

An especially good shape foresees two flat steel pieces welded diverging at a 90° angle from the base and therefore forming a U-shape with no anglings and the docking buffer therefore only has two anglings in its moving sections.

Figure 2:
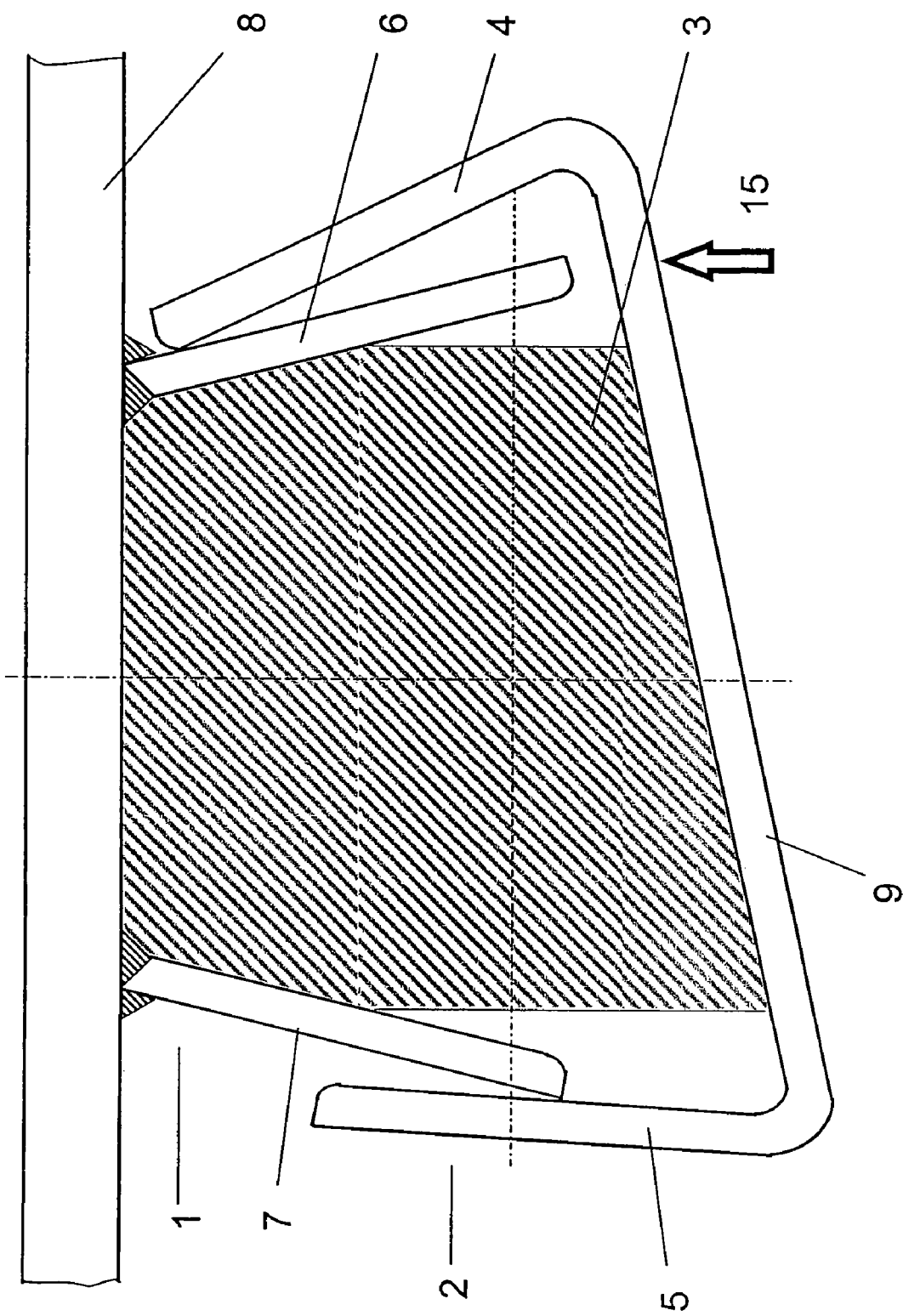
Figure 3:
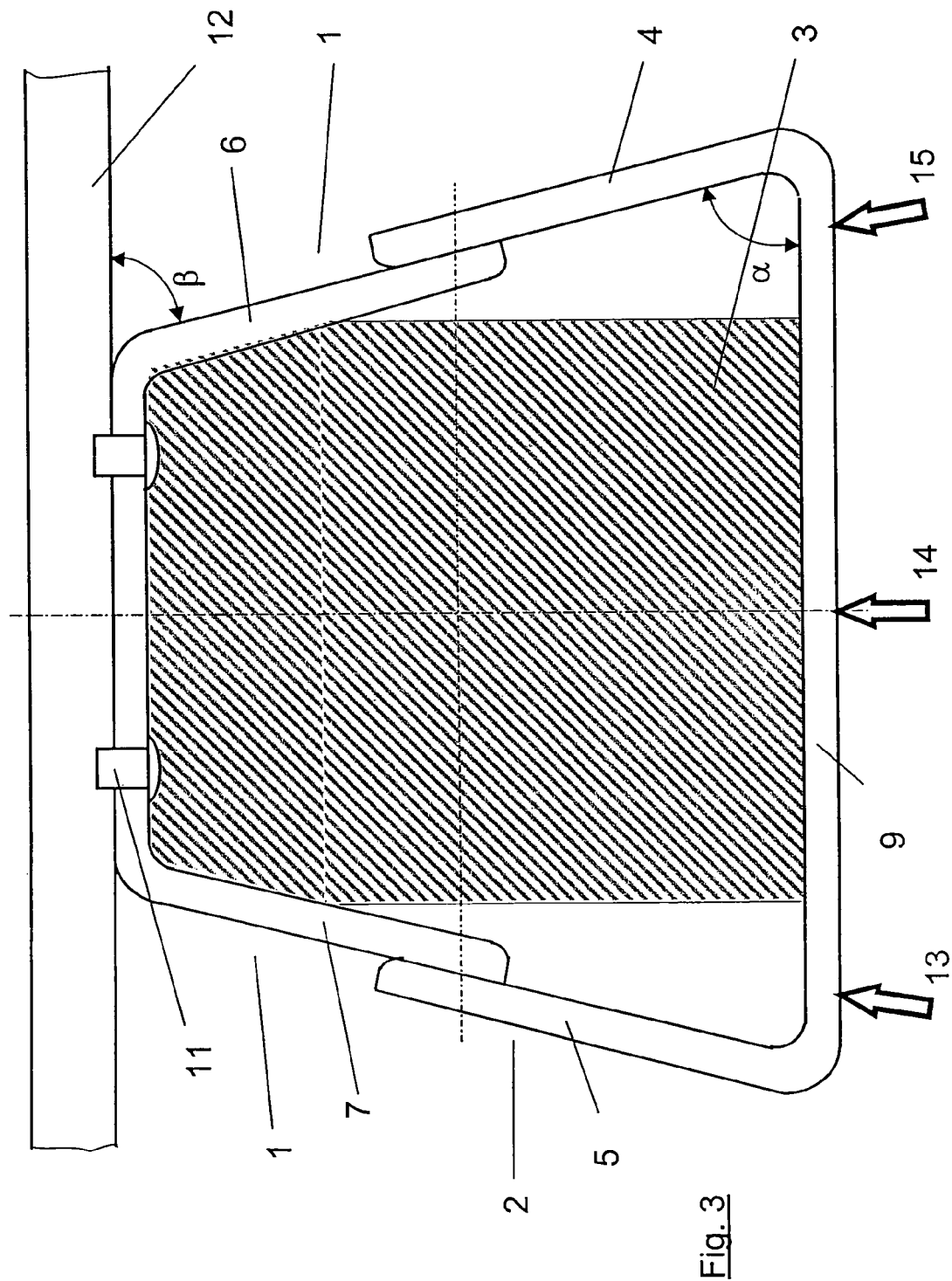
Figure 4:
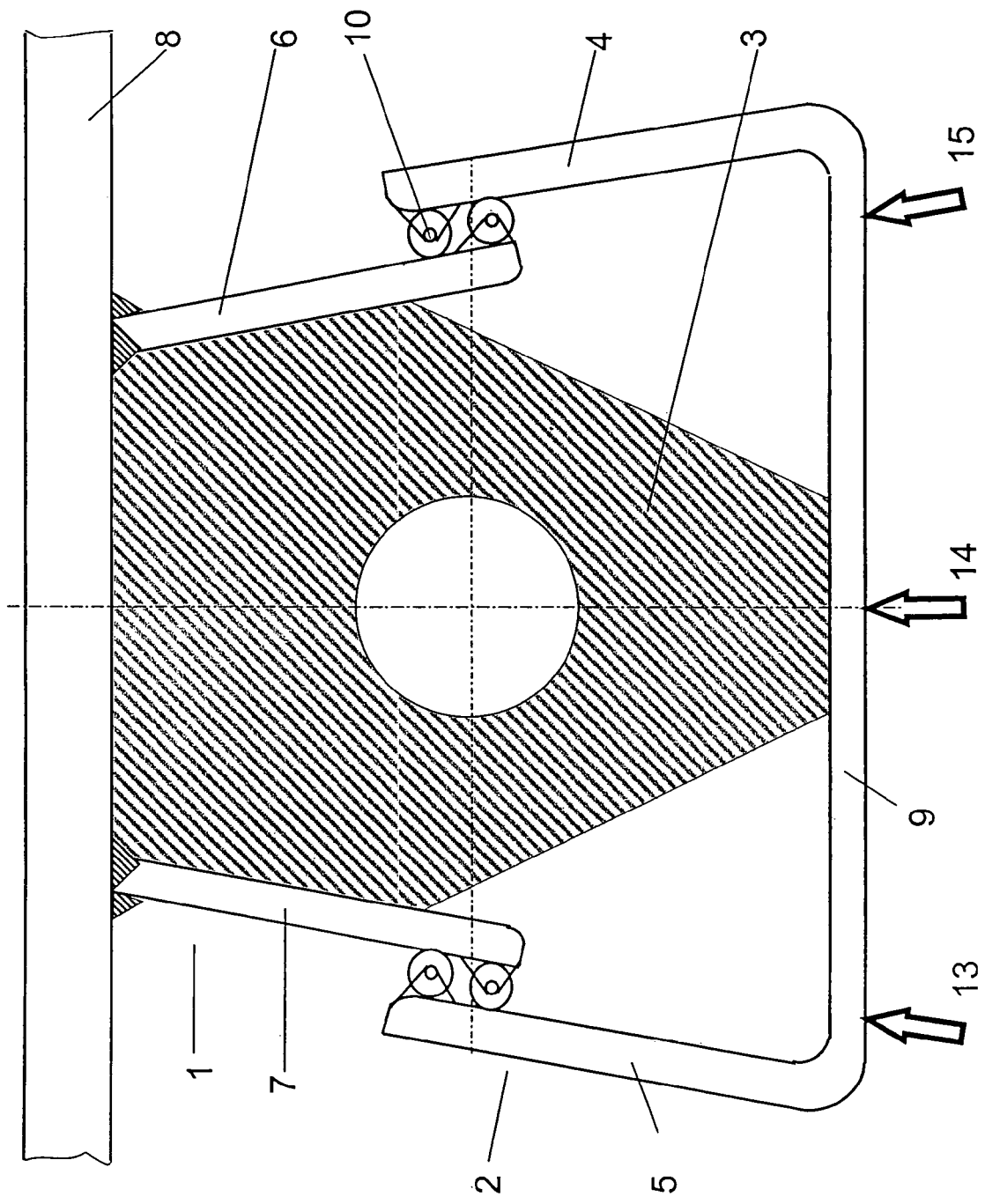
Figure 5:
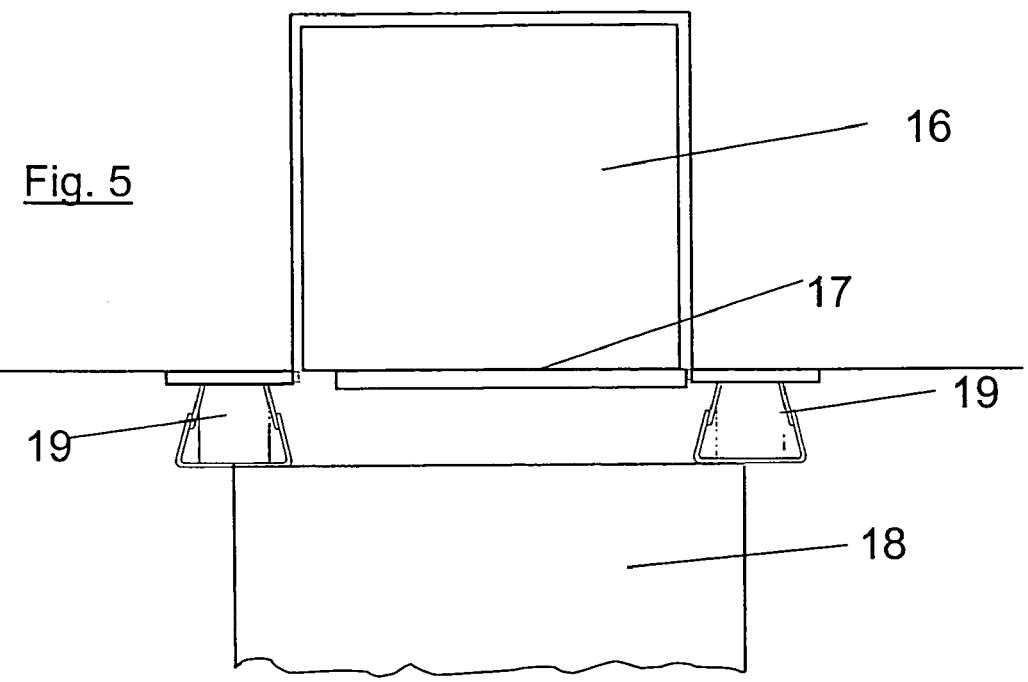
Figure 6:
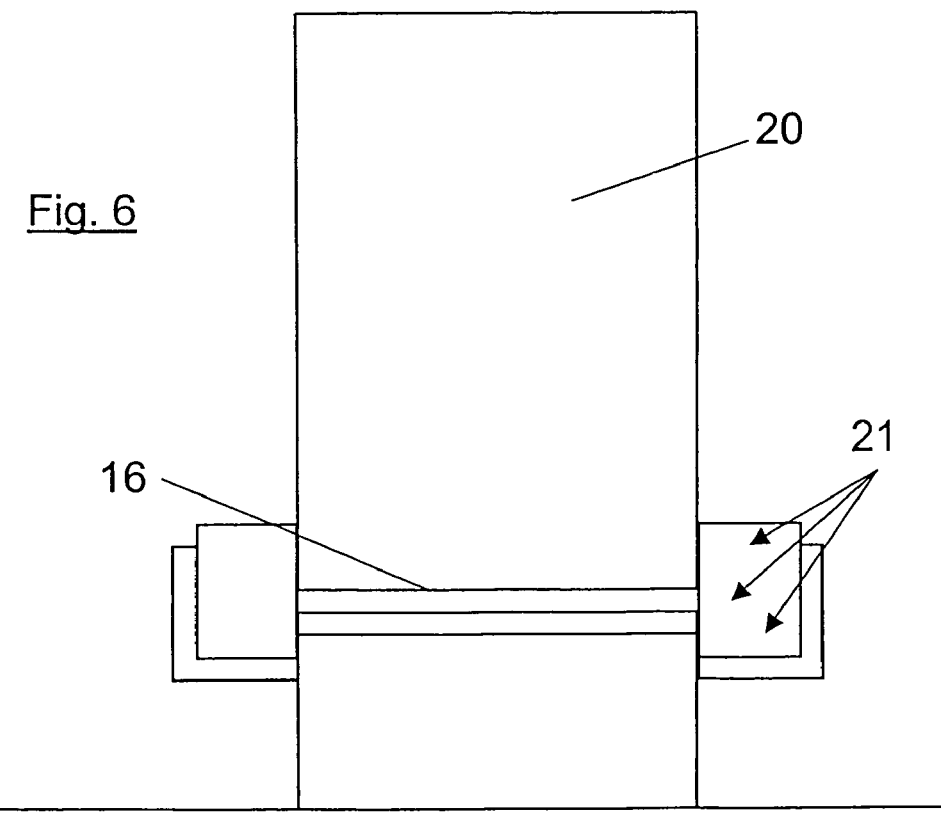

In the following the structure and the function of the invention will be described in detail on the basis of illustrations. These are:

FIG. 1 Top view of a type of execution of the docking buffer with a limb welded onto the base plate in its initial state FIG. 2 Top view of a type of execution of the docking buffer with a limb welded onto the base plate with a single-side impact FIG. 3 Top view of a detachable docking buffer attached to a ramp FIG. 4 Top view of a docking buffer with rollers on the limbs FIG. 5 Top view of docking buffers attached to a loading bridge FIG. 6 Front view of a loading bridge with docking buffers as per FIG. 6

FIG. 1 shows a form of execution of the invented docking buffer with its essential basic elements.

The U-shaped part 1 with the limbs 6 and 7 is here formed by a flat steel welded vertically onto base plate 8 and diverging at an angle β from 90° from base plate 8. The opening between the limbs 4 and 5 as well as 6 and 7 and the size of the angle α and β are selected so that the limbs 4 and 5 enclose limbs 6 and 7. This clearly shows that the U-shaped part 2 has a larger width than the U-shaped part 1 and therefore provides a greater assurance of docking. With the U-shaped part 2 the limbs 4 and 5 converge at an angle a diverging from 90° from the base plate 9. The angles α and β are nominally the same, however, the permissible tolerances are to be chosen so that the angle α and β have a minimal negative tolerance for the production. This will assure that the angle is not too large thus stopping the U-shaped part 1 from being enclosed by U-shaped part 2. The U-shaped parts 1 and 2 are made of very solid material so as to minimize wear and deforming caused by impact. The damping element 3 is elastic, either elastomers or rubber mixtures in an appropriate composition and of different shapes, as can be seen in FIGS. 1, 3 and 4.

If the U-shaped part 2 is pressed against the base plate 8 by the docking vehicle, the damping element 3 is elastically deformed and the desired elastic effect results. The damping element 3 pushes the U-shaped part 2 back into the initial position and centers itself when the external load is released. The distance between the two U-shaped parts 1 and 2 returns to some extent independently to "zero". With various forming of the damping element 3, both with regard to the material as well as the shape, it will be possible to generate differing elastic parameters (e.g. progressive, digressive, linear, jump functions). The docking buffer also has the advantage that the damping element 3 can be changed with just a few movements and without additional tools and therefore quickly exchanged with a different one, for instance, with different properties.

FIG. 2 shows the docking buffer in function when the impact is not in the middle. It is obvious that the U-shaped part 2 moves away from the end of the limb 7 of the U-shaped part 1 as a result of the impact at 15 and that there is a sort of pivotal position at the end of limb 6. If the U-shaped part 2 is impacted in the middle at point 14 on the base plate 9, both limbs 4 and 5 separate from the ends of limbs 6 and 7 of U-shaped part 1. U-shaped part 2 begins to float. This then has a certain amount of play on the side and therefore is allowed a lateral adjustment in the compressed state. In both cases, abrasions between limbs 4 and 6 and 5 and 7 as witnesses in known engineering solutions as well as the wear are avoided.

With the invention the U-shaped part 1—as can be seen in FIG. 3—can also be formed by a non-rectangular angled U-profile. In this form of execution the same geometrical conditions with regard to the angles α and β as well as the depth of limbs 4, 5, 6, and 7 are selected as described above in FIG. 1. The docking buffer is attached to the ramp 12 with a mechanical connection 11. This form of execution of the docking buffer has the advantage that it can be inexpensively retrofitted. To avoid a complicated adjustment of the height of the vertically placed docking buffer, the length of the U-shaped parts 1 and 2 can be chosen according to the specific needs.

On the lower end of the U-shaped part 1 there is a supportive device, for instance, punched sheet-metal plating or a grid to stop both the damping element 3 and the mobile U-shaped part 2 from falling and from collecting of humidity, in particular rainwater.

The U-shaped part 2 can also be covered with a metal plate, cut appropriately, by means of an additional angling.

FIG. 4 shows the form of execution of the invented docking buffer where roller bearings 19 are placed between the limbs 4 and 6 as well as 5 and 7. To hold the moveable U-shaped part 2, the rollers can also be used as the stopper.

FIG. 5 and FIG. 6 show examples of a possible set-up of the docking buffer 19 and, with the impact positions 21 possible docking situations for vehicles. It can be seen that the invention with the impact positions 21 at the moveable U-shaped part 2 provides a significantly greater freedom of movement than the known engineering solutions and therefore provides a better condition for avoiding damage to buildings—so-called force tensions in the connective construction.

REFERENCES IN ILLUSTRATIONS

1 U-shaped part
2 U-shaped part
3 Damping element
4 Limb
5 Limb
6 Limb
7 Limb
8 Base plate
9 Base plate
10 Roller bearings
11 Mechanically detachable connection
12 Loading ramp
13 Point of impact
14 Point of impact
15 Point of impact
16 Loading bridge
17 Feeder or retractable ramp
18 Loading bed
19 Docking buffer
20 Gate
21 Possible point of impact

SUMMARY

Docking buffer to be attached to ramps, especially loading ramps and loading bridges, with elastic damping element 3 between two U-shaped parts 1;2 made of hard, shock-resistant material the limbs of which 4;5 and 6;7 are located next to one another and can be displaced in relation to one another, the limbs 4;5 of the U-shaped part 2 are convergent around an angle a deviating from 90° to a base plate 9 and the limb 6;7 of the U-shaped part 1 are convergent around an angle α deviating from 90° to a base plate 8, whereby the opening widths between the ends of the limbs 4;5 and 6;7 and the sizes of the angles α;β are selected so that the limbs 4;5 enclose limbs 6;7.

The invention has the advantage that it is a simple design and therefore an inexpensively produced docking buffer which also assures protection from an indirect impact. By means of a greater width of the moveable part compared to the immoveable part there is a larger impact surface for the docking vehicle.

The invention claimed is:

1. Docking buffer to be attached to ramps, especially loading ramps and loading bridges, with elastic damping element (3) between first and second U-shaped parts (1;2) made of hard, shock-resistant material the limbs of which (4;5 and 6;7) are located next to one another and can be displaced in relation to one another, wherein the limbs (4;5) of the first U-shaped part (2) are convergent around an angle ($\alpha$) deviating from 90° to a first base plate (9) and the limb (6;7) of the second U-shaped part (1) are convergent around an angle ($\beta$) deviating from 90° to a second base plate (8), whereby the opening widths between the ends of the limbs (4;5) and (6;7) and the sizes of the angles ($\alpha;\beta$) are selected so that the limbs (4;5) of the first U-shaped part enclose the limbs (6;7) of the second U-shaped part.

2. Docking buffer in accordance with claim 1, wherein the size of the angle ($\alpha;\beta$) is selected, depending on the lengths of limbs (4;5;6;7), so that in cases of unilateral impact of the first U-shaped part (2) its limbs (4;5) cannot spatially avoid the enclosing of the limbs (6;7) of the second U-shaped part.

3. Docking buffer in accordance with claim 1, wherein the limbs (6;7) are welded to the second base plate (8) and form the second U-shaped part (1).

4. Docking buffer in accordance with claim 1, wherein the docking buffer is attached to a ramp (12) with the second base plate (8) by means of a mechanically detachable connection (11).

5. Docking buffer in accordance with claim 1, comprising a supporting device attached on a bottom end of the second U-shaped part (1).

\* \* \* \* \*